Nov. 6, 1962
J. B. WILEY
3,062,976
DYNAMOELECTRIC MACHINE
Filed Nov. 18, 1960
2 Sheets-Sheet 1
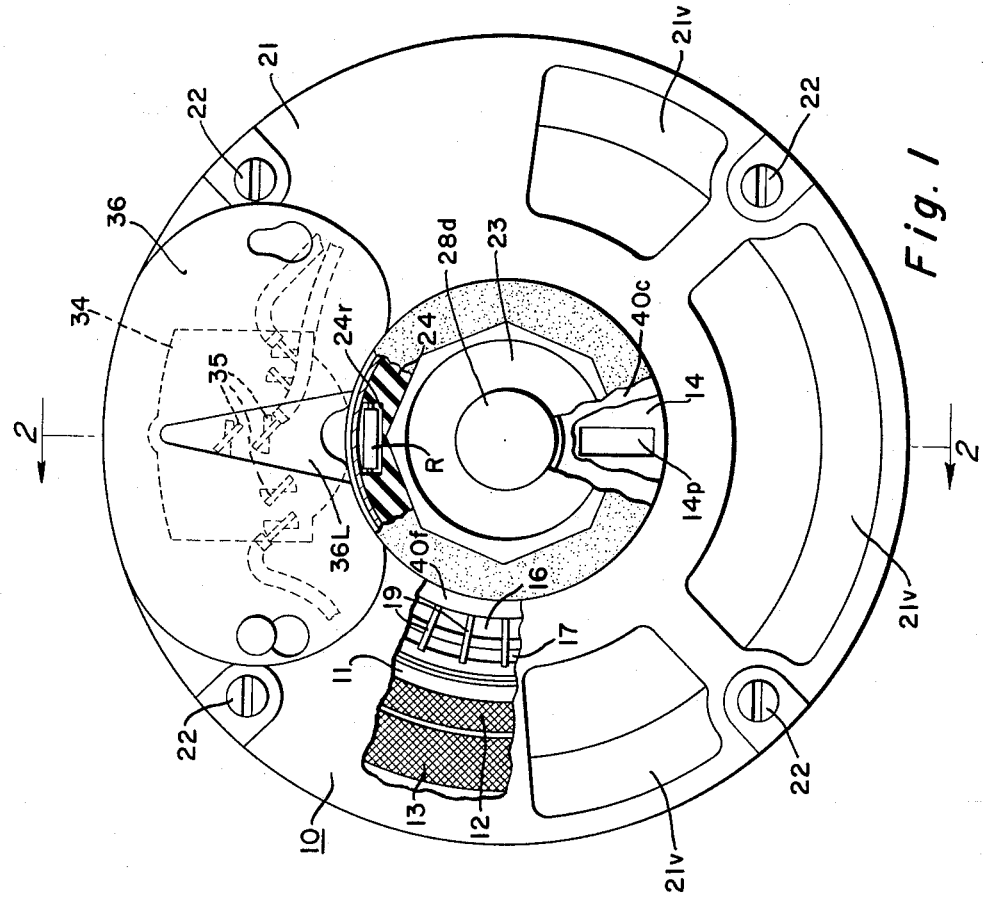
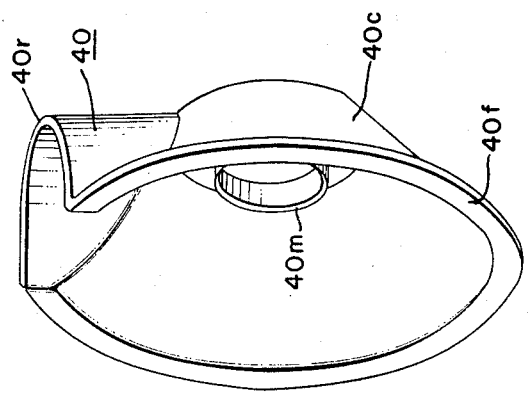
INVENTOR.
John B. Wiley
BY
Albert H. Reuther
His Attorney

United States Patent Office 3,062,976
Patented Nov. 6, 1962

3,062,976
DYNAMOELECTRIC MACHINE
John B. Wiley, St. Catharines, Ontario, Canada, assignor to General Motors Corporation, Detroit, Mich., a corporation of Delaware
Filed Nov. 18, 1960, Ser. No. 70,261
2 Claims. (Cl. 310—60)

This invention relates to electrical apparatus, and, particularly, to a dynamoelectric machine having an assembly of parts which can be fitted together variously to achieve versatility in ventilation and compact though interchangeable fit of components.

An object of this invention is to provide a new and improved dynamoelectric machine assembly which is compact yet versatile and economical to produce with multi-way ventilation utilizing larger vent openings.

Another object of this invention is to provide a dynamoelectric machine with a generally cone-like baffle means to shield a rotor-shaft mounted centrifugal device the size of which can be changed though using the same baffle means, the outer peripheral edge of which extends adjacent to a radially inner end of each of a plurality of fan blades cast integrally with the rotor windings, the fan blades along their radial edges remote from the rotor defining a dynamic air wall to avoid leakage of cooling air from a path directed radially outwardly into stator winding end turns.

Another object of this invention is to provide a dynamoelectric machine with a generally cup-shaped baffle means to direct air flow from a path longitudinally through rotor passages into a radially outward direction and having an integral semi-closed channel portion to shield a rotor-shaft-mounted centrifugal device only so far as a radially inner end of each of a plurality of fan blades cast on the rotor on one end and on the opposite end of which further laminations can be stacked for added rotor iron journalled by shaft mounting in end covers permitting ventilation of stator windings from both sides though the rotor can be reversed in mounting as well as direction of rotation.

A further object of this invention is to provide a dynamoelectric machine having a substantially cylindrical housing portion with opposite end frames each having a hub to be mounted by elastomeric bushings one of which has a grounding resistor buried in a radial recess thereof and both frames having larger vent openings located farther out toward an external peripheral edge so as to permit direction of entering air axially to stator end turns rather than having air holes in center locations where less air can enter and pass to the end turns, there being fan blade means carried by a rotor and located substantially radially outside and in radial alignment with a substantially cup-shaped baffle means having a semi-circular radial portion adjacent to a centrifugal device shielded thereby only for a minimum distance outwardly and requiring a minimum of metal material for economy in expense and weight thereof.

Another object of this invention is to provide a dynamoelectric machine having in combination a pair of radially extending end frames on opposite ends of a substantially cylindrical housing portion, each of the end frames having outer peripherally openings extending arcuately substantially axially and longitudinally in alignment with end turns of stator windings spaced from the end frames sufficiently for permitting internal mounting of capacitor means adjacent to the end frames while a centrifugal switching device including contact means carried by one end frame and a rotor-shaft-mounted weight means is shielded by baffle means also carried by the rotor shaft in a location to deflect cooling air past through rotor openings into a path radially outwardly toward stator winding end turns.

Further objects and advantages of the present invention will be apparent from the following description, reference being had to the accompanying drawings wherein a preferred embodiment of the present invention is clearly shown.

In the drawings:

FIGURE 1 is a partially sectioned end view of the dynamoelectric machine in accordance with the present invention.

FIGURE 3 is a perspective view of baffle means provided in the machine of FIGURES 1 and 2.

Figure 2:
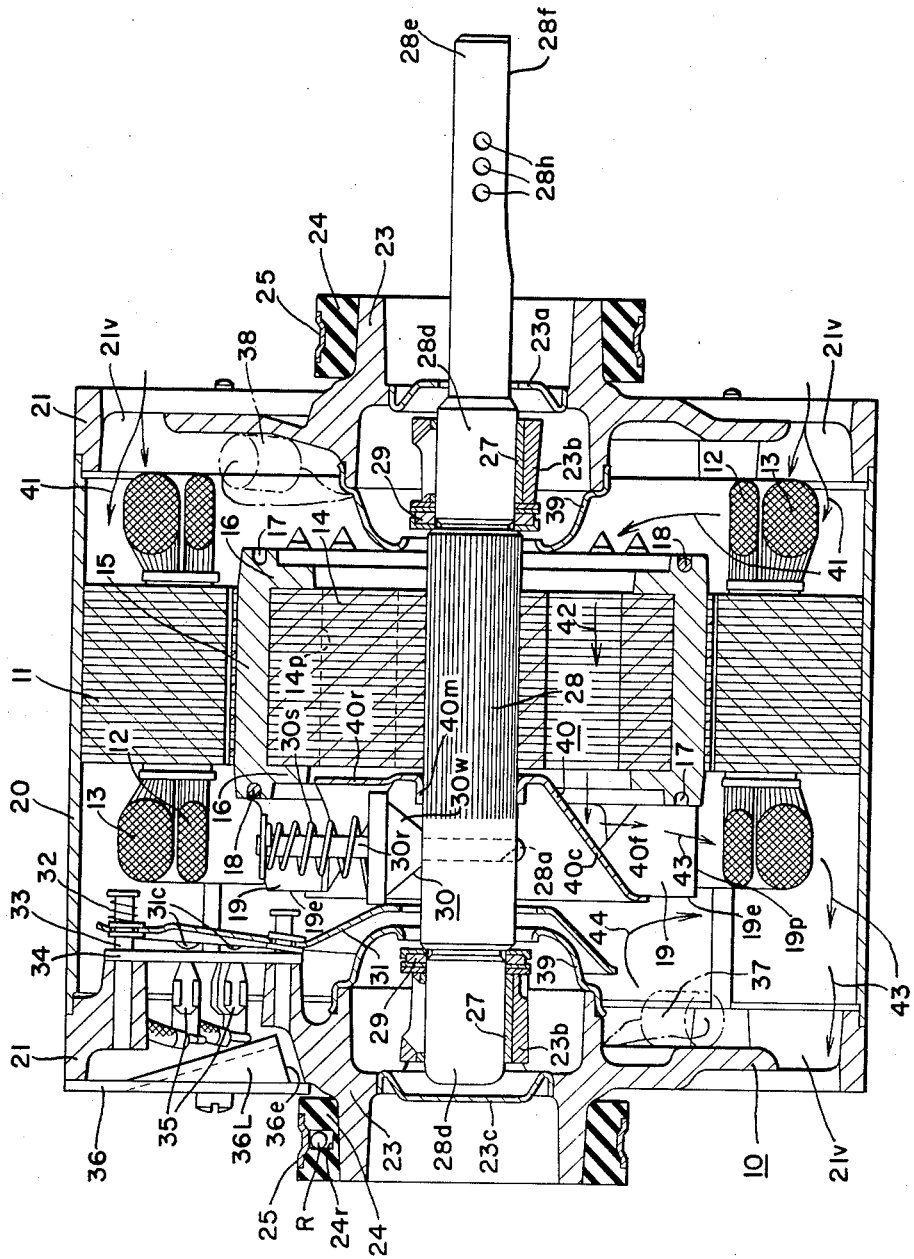
FIGURE 2 is a cross-sectional elevational view taken along line 2—2 in FIGURE 1.

FIGURE 1 illustrates a dynamoelectric machine generally indicated by numeral 10 including a stator or slotted magnetic core 11 having stator windings 12 and 13 carried thereby. The dynamoelectric machine 10 further includes an armature or rotor 14 journalled radially inside the stator 11 and having a cast metal squirrel cage winding including conductor bars in radial slots of the rotor 14. These conductor bars are identified by reference numeral 15 and are joined on each of opposite sides by integrally cast end rings 16 of which one portion is visible also in FIGURE 1. Each of the end rings 16 is provided with groove means 17 in which balancing weight material 18 can be wedged where necessary. Cast integrally or carried by one of the end rings 16 there can be a plurality of fan blades 19 extending substantially in radial alignment with end turns of stator windings 12 and 13 on one side of the stator core 11 as shown in FIGURE 2.

The stator 11 is secured or press-fitted into engagement with an inner periphery of a substantially cylindrical body or housing portion 20 on opposite ends of which a pair of covers or end frames 21 can be secured such as fastening means or screws 22. Each of the covers or end frames includes a hub portion 23 extending axially in opposite directions and each adapted partly to be engaged by an elastomeric bushing 24 over which an annular metal sleeve 25 can fit for mounting of the dynamoelectric machine relative to an appliance such as a washing machine, clothes dryer and the like. One of the bushings 24 has a radial recess 24r therein in which a resistance means R can be fitted and electrically connected for grounding purposes between the hub 23 and ring or sleeve 25 in the mounting.

Each of the hubs 23 includes a spider-like bearing portion 23b into which a concentrically located plane sleeve bearing 27 can be press-fitted for journalling a centrally splined or knurled shaft 28 having reduced diameter portions 28d supported by the plane bearings 27. Thrust washer means can be proved between shaft 28 and bearings 27 as well as the bearing portion 23b of each of the hubs 23. Adjacent to the one end of the reduced diameter portion 28d there is a cover 23c press-fitted into engagement with the hub 23 for closing off a central opening on one end of the dynamoelectric machine. It is to be understood that this cover 23c could also have a central aperture through which an extension of the shaft could extend in a manner similar to the shaft at an opposite end having an extension 28e which projects through an annular plate 23a press-fitted or secured to an inner periphery of the hub 23. The extension 28e can be provided with both a flat longitudinally extending portion 28f as well as a plurality of drilled apertures for holes 28h for mounting of pulley means and the like for transmission of torque and power from the dynamoelectric machine 10 to a load such as a washing machine or clothes dryer.

The shaft 28 includes a transverse aperture 28a on one side of the central splined or knurled portion for mounting of a centrifugal device 30 including a weight 30w radially movable in a reciprocable path along a rod 30r press-fitted or otherwise suitably secured to the inner periphery of the aperture 28a. The weight 30w is normally biased radially inwardly by a spring means 30s located concentrically around the rod 30r which can have an enlarged end or head portion in a location remote from the shaft 28 so as to permit positioning of the spring means 30s in a compressed condition between the weight 30w and one end of the rod 30r. The centrifugal device is of a type disclosed basically in Werner Patent 2,182,977, refinements of which are set forth in Shewmon Patents 2,623,979 and 2,762,900 as well as in other patents belonging to the assignee of the present invention. As to operation of the centrifugal device 30, reference can be made to these other patents and suffice it to say that the weight 30w is engageable against a "skillet" switch means or dish-like member 31 which can be shifted against bias of the spring means 32 mounted about a post 33 fitted to one of the covers or end frames 21 as visible in FIGURE 2. Shifting of the dish-like switch means effects opening and closing of contacts such as 31c engageable with complementary contacts (not shown) carried by an insulating member 34 to which terminal means 35 and lead wires can be connected. An access plate 36 visible in FIGURES 1 and 2 can be mounted by suitable fastening means on the end frame 21 adjacent to the centrifugal switching device 30. The access plate 36 can be provided with a louver portion 36L opened radially inwardly at one end 36e to permit ventilation and flow of cooling air in accordance with features of the present invention set forth in further detail in the following paragraphs.

Each of the covers or end frames 21 includes radially outwardly located vent openings 21v which are substantially longitudinally and axially in alignment with end turns of the radially outer stator winding 13 as shown in FIGURE 2. Capacitor means 37 and 38 outlined in the view of FIGURE 2 can be mounted inside the dynamoelectric machine 10 on each of the opposite end frames or covers 21. These capacitor means 37 and 38 can be used for phase shift during starting and running operation in a usual manner. However, location of the capacitor means 37 and 38 inside the dynamoelectric machine 10 contributes to compactness of the entire structure particularly for appliance purposes where space is an important factor. Provision of the larger vent openings 21v located farther out toward a radially outer periphery of the covers or end frames 21 permits direction of flow of cooling air to the end turns of stator winding with greater efficiency and in greater volume than permitted with previously known air holes located more centrally adjacent to structure such as the bearing portion 23b of the hubs 23. In fact, a pair of toroidal metal guards or members 39 secured to the hubs 23, as shown in FIGURE 2, substantially shield the bearings 27 and thrust washers 29 from any flow of air and assure retention of lubricant for the bearings which can be packed with a cellulose-type material (not shown) to assure minimum lubrication requirements. It is to be noted that the members 39 can differ in shape and that the rotor 14 can have additional iron or metal added thereto such as in the form of additional laminations to increase the axial dimensioning or stack thereof for added rotor iron where differing motor performance is required. In fact, the shaft 28 together with the rotor 14 can be journalled relative to the covers or end frames 21 in either of opposite directions and the rotor can be caused to rotate in forward or reverse without requiring any modification in end frame or housing portion structure. Further, in accordance with the present invention, the rotor 14 includes a plurality of longitudinal or axially extending passages 14p visible in FIGURES 1 and 2. The purpose of these passages 14p will be further apparent with respect to ventilation and cooling operation described in accordance with the present invention.

A baffle means generally indicated by numeral 40 is carried by the shaft 28 as shown in FIGURE 2. The baffle means 40 includes a cone-like or substantially cup-shaped body portion 40c that extends angularly such as in a range between 35 and 55 degrees to the axis of shaft 28. The angle shown in FIGURE 2 is substantially 45° such that air flow through rotor passages 14p is changed in direction substantially at right angles to move radially outwardly under force of fan blades 19 to the end turns of stator windings 12 and 13. Arrows identified by 41, 42 and 43 shown in FIGURE 2 represent substantially three paths in differing directions and serving first to cool end turns of the stator windings 12—13 on one side as represented by arrows 41, then moving through the rotor passages 14p as identified by arrows 42 for cooling of the rotor 14 subsequently to be urged under force of deflection against the cone-like body portion of the baffle means 40 and radially outwardly from the fan blades 19 into space surrounding the opposite end turns of the stator windings 12—13 in a path represented by arrows 43. It is to be understood that an invisible barrier or "air" wall represented by arrow 44 is set up such that the air flow radially outwardly as effected by the fan blades 19 cannot result in any substantial leakage of cooling air axially in a direction away from or remote from the rotor 14 along radial edges 19e of the fan blades 19. Thus, the baffle means 40 need not extend radially outwardly to the outer peripheral edge 19p of the fan blades 19 but can be foreshortened to terminate in a minimal flange portion 40f which abuts against a radially inner end of the radial edges 19e. An annular mounting flange 40m can be bent to extend substantially axially and to have an inner periphery that can be tightly press-fitted onto the splined or knurled portion of the shaft 28. The cone-like body portion 40c serves to deflect cooling air passing from the passages 14p into a path radially outwardly under urging of the fan blades 19. It is to be understood that entry of cooling air on one side through vent openings 21v to the end turns of stator windings 12—13 on one side will also effect flow of cooling air across capacitor means such as 38 while formation of the "air" wall as represented by arrows 44 is a result of limited turbulence and entry of cooling air through vent openings 21v of an opposite cover or end frame 21 so as to result in flow of cooling air around the other capacitor means 37. Thus, both capacitor means can be sufficiently cooled to assure proper functioning and protection of capacitor means against excessive heating. The abutment of the flange portion 40f of the baffle means 40 against the radially inner end of edges 19e of the fan blades 19 can be seen in FIGURES 1 and 2.

Shortening of the flange portion 40f to a location less than full radial length outwardly to the periphery 19p of fan blades 19 assures use of less metal for formation of the baffle means 40 and also provides less weight or mass that need be rotated wiith the armature or rotor journalled by the shaft 28 relative to the end frames or covers 21. For accommodating the centrifugal device 30 including the weight 30w radially movable therewith, it is necessary that the baffle means 40 be modified to include a semi-circular radial portion 40r. This semi circular radial portion is in effect truncated due to the cup-like or conical body portion 40c intersecting therewith. The deflecting purpose of the conical or cup-like body portion 40c is not substantially altered by provision of the radial portion 40r since the curved periphery of the radial portion 40r results in displacement of any air striking thereagainst to move angularly away from the outer periphery of the radial portion 40r and against the outer periphery of the cone-like body portion 40c to be deflected radially outwardly. It is to be understood that the rotor or armature can be properly balanced by wedging of weights 18 into grooves 17 in predetermined locations for offsetting any uneven distribution of weight due to provision of the centrifugal device 30 and the like. It is to be noted that the button-like weight 30w never in any way contacts or rests upon the baffle means 40 and that various sizes of weights can be accommodated on the rod 30r fitted to a single drilled hole of shaft 28. Thus, the operation of the centrifugal device 30 can be controlled to occur for effecting switching between starting and running operation at various speeds in accordance with the particular weight stack-up provided on the rod 30r and adapted to be biased normally in a radially inner position by the spring means 30s. Provision of the vent openings 21v in radially outer locations permits use of relatively larger areas of the end frames or covers 21 for ventilating purposes and assures directing of the cooling air into paths of differing directions including substantially all of the space surrounding the opposite end turns of the stator windings 12—13. Appreciably less cooling air could enter smaller and more radially inwardly located vent openings such as previously known. The baffle means 40, in accordance with the present invention, assures deflection of cooling air from a path directed axially through the rotor 14 including passages 14p. Provision of the radial portion 40r assures against any substantial leakage of cooling air axially to either side of the baffle means 40 since the radial portion 40r in effect forms an abutment-like shield to assure unencumbered radial in and out movement of the weight 30w along the rod 30r. At least three directions of air flow can be effected using the baffle means and fan means arranged in accordance with the present invention with respect to the vent openings 21v on each of opposite sides of the motor housing and axially interconnected by radially inwardly located rotor passages 14p. Versatility of the dynamoelectric machine is assured by provision of the flat portion 28f on the shaft end 28e extended as shown in FIGURE 2. Also, it is apparent that by adding laminations to the rotor stack-up it is possible to modify electrical performance characteristics of the dynamoelectric machine without altering external dimensions for use of the dynamoelectric machine on appliances where space is at a premium. It is noted that the fastening means 22 can be in the form of through bolts when required and that double shaft extensions for special purpose motors can be provided for specific total shaft length. In the embodiments illustrated by FIGURE 2, the side of the motor where the shaft extension 28e is located can be referred to as the "drive end" and on the opposite side the designation can be represented as the "switch end."

It is to be noted that the baffle means 40 is really more a barrier to control where air is directed and stopped rather than only deflected. Baffle means 40 in accordance with the present invention has no radially outer portion that would abut fully to an outer corner of edges 19e and thus there is at least a one-third reduction in cost of material required. Also, it is noted that suitable counterbalancing weight in the form of cylindrical cut-off portions of metal bar stock can be attached in a location adjacent to a blade such as 19 and diametrically opposite the weight 30w of switch means 30. It is easier to control amount of counterbalance weight by cutting of a piece of round bar stock.

While the embodiments of the present invention as heretofore in disclosed constitute preferred forms, it is to be understood that other forms might be adopted.

What is claimed is as follows:

1. A dynamoelectric machine for use on appliances such as clothes washers, clothes dryers and the like, comprising, a housing means including a substantially cylindrical body portion having end frames at opposite ends, each of said end frames having relatively large vent openings adjacent to outer peripheries thereof, a stator means including windings having end turns on each side thereof located inside said housing means, rotor means including longitudinal passages therethrough in a location radially inside rotor windings adjacent to one side of which there are fan blade means projecting radially outwardly, shaft means to journal said rotor means to said end frames, a centrifugal switching device inside said housing means and including radially shiftable weight means carried by said shaft means as well as terminal and contact means mounted on one of said end frames adjacent thereto, and a baffle means mounted on said shaft means adjacent to said rotor means, said baffle means having a body portion extending angularly away from both said shaft means and rotor means except for a radial portion integral therewith to provide shielding for weight means movement, said baffle means providing deflection for cooling air flow between vent openings of opposite end frames by way of the rotor passages and the end turns of opposite sides of the stator windings, said body portion of said baffle means having a radially outer annular flange that abuts against radially inner edges of sid fan blade means substantially in radial alignment with both said weight mens and stator winding end turns along one side thereof, there being an "air" wall formed dynamically along one side of said fan blade means in a location radially outside said flange.

2. In an enclosed dynamoelectric machine having a shaft-supported rotor means including substantially longitudinal passages therethrough and fan blade means journalled for movement relative to a stator and having rotor as well as stator windings including end turns on each side thereof located inside housing means provided with relatively large vent openings adjacent to opposite peripheral ends thereof, the improvement which comprises a shaft-supported baffle means having a body portion at least in part extending angularly away from both the shaft means and rotor means and providing deflection for cooling air flow between the vent openings adjacent to opposite peripheral ends of the housing means by way of the rotor passages and the end turns of opposite sides of the stator windings, said body portion of said baffle means having a radially outer annular flange that abuts against radially inner edges of the fan blade means substantially in radial alignment with the stator winding end turns as well as an edge of the fan blade means in a location opposite to a side thereof where the rotor means is located, there being an "air" wall formed dynamically along one side of the fan blade means in a location radially outside said flange.

References Cited in the file of this patent

UNITED STATES PATENTS

| 374,858 | Westinghouse | Dec. 13, 1887 |
| 1,380,134 | Cook | May 31, 1921 |
| 2,691,124 | Aske | Oct. 5, 1954 |

FOREIGN PATENTS

| 1,158,926 | France | Feb. 3, 1958 |